Jan. 18, 1966 C. C. ROUTH 3,230,292

CATHODE RAY TUBE MODULATOR

Filed Dec. 27, 1963

INVENTOR.
CLAUD C. ROUTH

BY

ATTORNEYS

United States Patent Office 3,230,292

Patented Jan. 18, 1966

3,230,292

CATHODE RAY TUBE MODULATOR

Claude C. Routh, San Diego, Calif., assignor to the United States of America as represented by the Secretary of the Navy Filed Dec. 27, 1963, Ser. No. 334,053
2 Claims. (Cl. 35—10.4)
(Granted under Title 35, U.S. Code (1952), sec. 266)

The invention described herein may be manufactured and used by or for the Government of the United States of America for governmental purposes without the payment of any royalties thereon or therefor.

The present invention relates to a cathode ray tube modulator and more particularly to a cathode ray tube modulator for producing an amplitude modulated carrier signal.

According to the invention a cathode ray tube having an electron gun, a deflection system and a light producing screen, of phosphorus, for example, is provided with Z axis modulation representing a carrier signal. This signal is impressed between cathode and control grid elements of the cathode ray tube. A mask of varying opaqueness is placed across the light producing screen and a light sensitive means such as a photo-multiplier tube on the other side of the mask. It can be seen that if the mask is transparent the photo-multiplier tube will see a varying intensity signal determined only by the carrier signal impressed between the grid and cathode of the cathode ray tube. The photo-multiplier tube would then yield an unmodulated carrier signal output. If the mask is one of predetermined varying opaqueness, and the cathode ray is deflected across the screen, the photo-multiplier tube will then see light from the cathode ray tube screen varying in intensity with the carrier signal and further modified or modulated by the pattern of varying opaqueness of the mask. The output from the photo-multiplier tube will then be an amplitude modulated signal having a carrier of the frequency of the signal applied between the grid and cathode of the cathode ray tube, and an amplitude dependent upon the opaqueness of the portion of the mask at which the cathode ray impinges at any given instant.

An object of the present invention is the provision of a cathode ray tube modulator in which amplitude modulation is achieved through a mask of varying opaqueness.

Another object is to provide the cathode ray tube modulator in which the carrier signal is impressed between the grid and cathode of the cathode ray tube.

A further object of the invention is the provision of a cathode ray tube modulator in which predetermined modulation patterns can be easily impressed upon a carrier signal.

Yet another object is the provision of a cathode ray tube modulator in which predetermined modulation patterns can be selected instantaneously by deflection voltage programming.

Still another object is to provide a cathode ray tube modulator which is simple and inexpensive and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
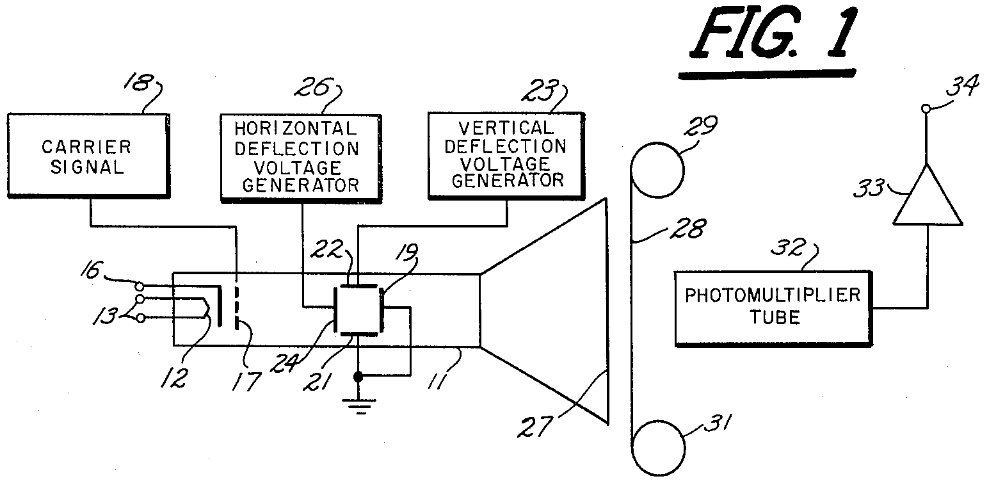
FIG. 1 is a block diagram of one embodiment of the present invention.

Referring to FIG. 1, cathode ray tube 11 has filament 12 connected to terminals 13 and cathode 14 connected to terminal 16. Grid 17 is connected to carrier signal 18. Horizontal deflection plate 19 and vertical deflection plate 21 are connected to ground. Vertical deflection plate 22 is connected to vertical deflection voltage generator 23, and horizontal deflection plate 24 is connected to horizontal deflection voltage generator 26. Light producing screen 27 is opposite mask 28. Mask 28 is rolled on rollers 29 and 31. Photo-multiplier tube 32 is opposite mask 28 and its output is connected to amplifier 33, the output of which is connected to output terminal 34.

Figure 2:
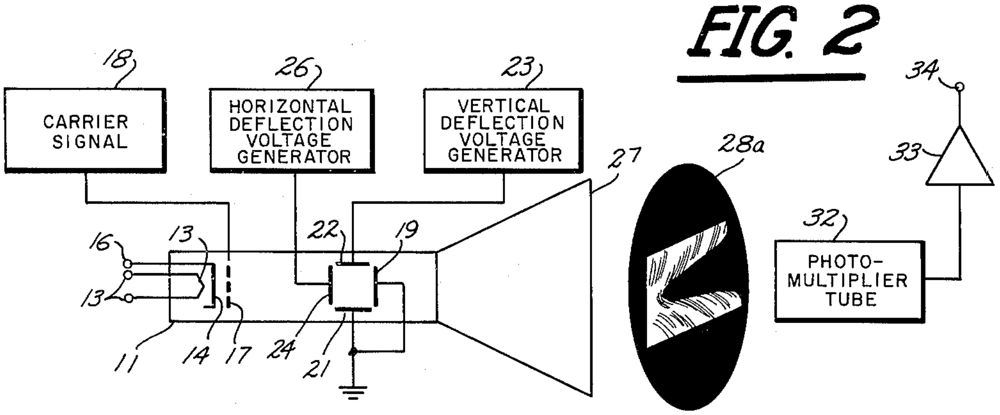
FIG. 2 is a block diagram of another embodiment of the present invention.

Referring to FIG. 2, cathode ray tube 11 is again shown with filaments 12 connected to terminals 13 and cathode 14 connected to terminal 16. Grid 17 is connected to carrier signal 18. Horizontal deflection plate 19 and vertical deflection plate 21 are connected to ground, vertical deflection plate 22 is connected to vertical deflection voltage generator 23, and horizontal deflection plate 24 is connected to horizontal deflection voltage generator 26. Light producing screen 27 is placed opposite mask 28*a*. Photo-multiplier tube 22 is placed on the other side of mask 28*a*. The output of photo-multiplier tube 32 is connected to amplifier 33, the output of which is connected to output terminal 34.

Figure 3:
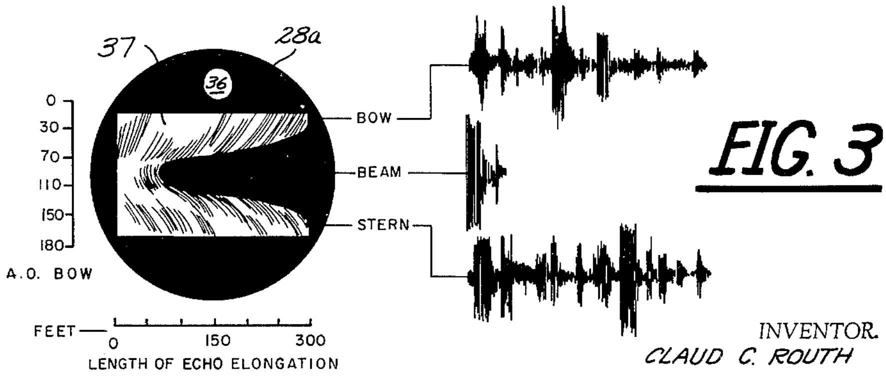
FIG. 3 illustrates a typical mask in conjunction with the embodiment of FIG. 2 together with the calibration and output signals thereof.

Referring to FIG. 3, mask 28*a* is shown in more detail. Mask 28*a* has blackened portions 36 and a light area 37 of varying opaqueness. The pattern is calibrated vertically in degrees and horizontally in feet. Typical output patterns are shown as the bow, beam, and stern patterns, respectively.

*Operation*

Referring back to FIG. 1, carrier signal 18 modulates the electron beam emitted from cathode 14 of cathode ray tube 11 by impressing the carrier signal between grid 17 and cathode 14. This is seen at screen 27 as an intensity modulated spot. Obviously, a very low persistence screen should be utilized to follow a high frequency carrier signal. If the mask, which is film 28, is translucent at the area corresponding to where the cathode ray impinges upon screen 27, light will impinge upon photo-multiplier tube 32 which again is intensity modulated at the carrier signal frequency. This will result in a carrier signal at the output of photo-multiplier tube 32 which is amplified in amplifier 33 and will be present at the output terminal 34. If film 28 has a pattern of varying opaqueness, this, too, will intensity modulate the light seen by photo-multiplier tube 32 and will amplitude modulate the carrier signal 18. The horizontal deflection voltage generator 26 and vertical deflection voltage generator 23 can be programmed to select a specific area of film 28 which will allow film 28 to be premodulated in more than one track if desired.

Referring to FIG. 2, the identical operation is shown with a fixed mask 28*a* being disposed between screen 27 of cathode ray tube 11 and photo-multiplier tube 32. This mask is shown in more detail in FIG. 3 and corresponds to an echo-ranging pattern of a submarine at various angles on the submarine's bow. The 90° angle (looking directly broadside at the submarine) is represented by the scale at the left of the mask 28*a* and has a very short area of translucence which in turn will result in an amplitude modulated signal at the output of photo-multiplier tube 32 shown opposite the beam pattern. On either side of the 90° angle (going towards 0 and 180°) are the bow and stern patterns which are similar. Here the reflected wave would be comprised of several individual reflections from the length of the submarine as is shown by the bow and stern amplitude modulated patterns. Hence, mask 28*a* is a submarine echo simulator and as utilized in the embodiment of FIG. 2, can be used for sonar operator training or echo correlation purposes. In this embodiment the horizontal deflection voltage generator 26 would be a sawtooth for sweeping the face of the screen at a predeterminel rate and vertical deflection voltage generator 23 would be merely for vertical positioning to simulate a particular angle on the bow. The horizontal scale shows the length of the echo received in feet.

It should be understood, of course, that the foregoing disclosure relates to only prefered embodiments of the invention and that it is intended to cover all changes and modifications of the examples of the invention herein chosen for the purposes of the disclosure which do not constitute departures from the spirit and scope of the invention.

What is claimed is:

1. A cathode ray tube modulator comprising:

(a) a cathode ray tube having an electron gun with control grid and cathode elements for generating an electron beam, horizontal and vertical deflection elements for deflecting said beam, and a light producing screen;

(b) light sensitive means for converting light intensity into variations of electrical current or voltage mounted in operable proximity to said light producing screen;

(c) an opaque mask with a central window pervious to light, the pervious portion of the window having random areas of varying opuaqueness, and the side edges of the window being nonparallel and being so oriented with respect to said horizontal and vertical deflection elements as to vary the length of the horizontal sweep in the window as a function of vertical deflection;

(d) a carrier signal coupled between said control grid and cathode elements for intensity modulating said electron beam; and (e) generating means for generating horizontal and vertical deflection signals in accordance with a predetermined modulation pattern, said generating means having horizontal and vertical signal outputs connected to said horizontal and vertical deflection elements, respectively.

2. A cathode ray tube modulator comprising:

(a) a cathode ray tube having an electron gun with control grid and cathode elements for generating an electron beam horizontal and vertical deflection elements for deflecting said beam, and a light producing screen;

(b) light sensitive means for converting light intensity into variations of electrical current or voltage mounted in operable proximity to said light producing screen;

(c) an opaque mask with a central window pervious to light, the pervious portion of the window having random areas of varying opaqueness and the boundary of the window being tapered in dimension and so oriented with respect to the horizontal and vertical deflection elements as to vary the length of the horizontal sweep in the window as a function of vertical deflection;

(d) a carrier signal coupled between said control grid and cathode elements for intensity modulating said electron beam.

References Cited by the Examiner

UNITED STATES PATENTS

| | | | |
|---|---|---|---|
| 2,489,883 | 11/1949 | Hecht | 250—217 |
| 2,613,263 | 10/1952 | Hilburn | 250—217 |
| 2,720,039 | 10/1955 | Brown | 35—10.4 |
| 3,031,774 | 5/1962 | Gray et al. | 35—10.4 |

FOREIGN PATENTS

| | | |
|---|---|---|
| 1,128,357 | 8/1956 | France. |

CHESTER L. JUSTUS, *Primary Examiner.*

MAYNARD R. WILBUR, *Examiner.*